3,392,178
PENTAFLUOROPHENYLORGANOMETALLIC
COMPOUNDS OF GERMANIUM AND TIN

Christ Tamborski, Dayton, Ohio, assignor to the United States of America as represented by the Secretary of the Air Force
No Drawing. Filed Mar. 31, 1964, Ser. No. 356,324
5 Claims. (Cl. 260—429)

ABSTRACT OF THE DISCLOSURE

Pentafluorophenylorganometallic compounds of germanium and tin are prepared through the reaction between a pentafluorophenyl Grignard reagent and a substituted or unsubstituted germanium or tin chloride to yield products as $(C_6F_5)_nM(C_6H_5)_{4-n}$, where M is either germanium or tin and $n$ is 1, 2, 3 or 4.

---

The invention described herein may be manufactured and used by or for the government of the United States of America for governmental purposes without the payment of any royalties thereon or therefor.

This invention relates to perfluoroaromatic compositions and particularly to perfluoroaromatic compounds containing metals of Group IV according to the Mendelyeevian Periodic Table of Elements. The invention also relates to the method for preparing such compositions and to their use as antioxidants.

While halogenated hydrocarbon compounds generally have been intensively developed and prominently used for a good many years, it is only in the past decade that perfluoroaromatic compounds have been available. Similarly, a variety of organo-metallic compounds have become known over the years; and some of these have included halogen-containing alkyl or aryl derivatives of various metals. Hitherto unavailable however have been the organo-metallic compounds resulting from the combination of perfluoroaromatic compositions with various metals, particularly those of the Group IV, and especially with tin, germanium and lead.

Those compositions of this general description which are presently known, have been made by a variety of substitution reactions employing a Grignard reagent; and, although they have resulted in the isolation of certain perfluoroaromatic derivatives, the yields have been low and the process costly. The novelty of these compositions is such that, aside from their melting point, solubility and other basic physical attributes, little is known of their properties, their reactivity or the uses to which they might be put.

It is accordingly an object of the present invention to provide novel compounds which are useful as antioxidants.

Yet another object of the invention is to provide as new compositions of matter perfluoroaromatic-metal compounds, particularly perfluoroaromatic tin and perfluoroaromatic germanium and perfluoroaromatic lead.

Yet another object of this invention is to provide a method for the preparation of such compounds wherein the yields thereof in quantity and purity will be substantially improved over the yields of similar compounds which have heretofore been obtainable.

Underlying the present invention is the discovery of the antioxidant properties, as hereinafter demonstrated, of the perfluoroaromatic or the perfluorophenyl-Group IV metal compounds according to the general formula

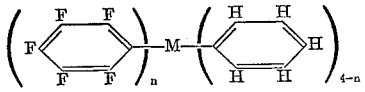

where M is one of the metals within Group IV of the Mendelyeevian Periodic Table of Elements and $n$ is an integer from one to four. As indicated by this formula, the compounds may be mixed perfluoroaromatic-aromatics having both fluorinated and unfluorinated carbon rings or they may be completely perfluoroaromatic. The improved antioxidant properties are available from a variety of these perfluoroaromatic Group IV compounds in the molecule of which there is at least on perfluoroaromatic radical. Included within the broad general group of antioxidant materials as new compositions of matter are tetraperfluorophenyltin, tetraperfluorophenylgermanium, tetraperfluorophenyllead, diphenyldiperfluorophenyltin, diphenyldiperfluorophenylgermanium, diphenyldiperfluorophenyllead, phenyltriperfluorophenyltin, triphenylperfluorophenyltin, triphenylperfluorophenylgermanium, phenyltriperfluorophenylgermanium and phenyltriperfluorophenyllead.

While some of these compounds can be isolated and are obtainable to a certain degree by the use of various Grignard reactions as above indicated, the present invention teaches their production in substantially greater quantities and in much purer form than have heretofore been available by resorting to a perfluoroorganolithium reaction wherein the lithium component, perfluorophenyllithium, is substituted in place of the Grignard reagent. Such a method is according to the general equation:

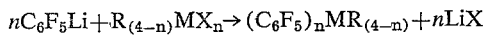

Where M is a Group IV metal, $n$ is an integer from 1 to 4 inclusive, X is a halogen and R is an aryl radical.

It has been found that when the above disclosed compositions are incorporated with other materials, they substantially improve the oxidation resistance or antioxidant properties of such other materials according to the examples and tests hereinafter detailed.

Specific examples of compositions within the scope of this invention and of the preferred method for their preparation are as follows:

Example I

Preparation of tetraperfluorophenyltin via perfluorophenyllithium.—Pentafluorobenzene (33.6 g., 0.20 mole) dissolved in 20 ml. of diethyl ether was added to a cooled (−70° C.) stirred solution of n-butyllithium (0.20 mole in 130 ml. hexane), dissolved in 260 ml. diethyl ether. The addition took 16 minutes and the temperature did not rise above −65° C. After 15 additional minutes Color Test IIA was negative indicating an absence of butyllithium. Stannic chloride (13.03 g., 0.05 mole) was added to the pentafluorophenyllithium over a period of four minutes. The reaction mixture was slightly exothermic as evidenced by a 5° rise in temperature. After 15 additional minutes the cooling bath (alcohol-Dry Ice) was removed and the reaction mixture warmed to room temperature. After one hour, with the reaction mixture at 0° C., Color Test I was negative, indicating an absence of pentafluorophenyllithium. The heavy white precipitate was filtered and the filtrate aspirated to dryness. The crude solids were combined and recrystallized from chloroform-methanol (1:1) yielding 32.87 g. (83.5%) pure tetraperfluorophenyltin, M.P. 221–223° C. The product was identified by infrared and elemental analysis.

Example II

Preparation of tetraperfluorophenylgermane via perfluorophenyllithium.—The same general procedure as outlined in Example I was followed except germanium tetrachloride was used in place of stannic chloride. The product tetraperfluorophenylgermane, MP 246° C. was recrystallized from benzene. A yield of 88% of pure product was obtained.

Example III

Preparation of tetraperfluorophenyllead via perfluorophenyllithium.—The same general procedure as outlined in Example I was followed except lead dichloride was used in place of stannic chloride. The reaction was carried out at −20° for two hours. The ether solvent was distilled and an equal volume of xylene was added. The reaction was refluxed for from four to six hours, filtered and recrystallized from methanol, MP 206° C. yield 30–50%.

To demonstrate the improved yields of the materials obtainable from the foregoing organolithium compositions, Grignard reactions were employed according to the following examples:

Example IV

Preparation of tetraperfluorophenyltin via perfluorophenylmagnesium bromide.—Perfluorophenylmagnesium bromide was prepared by the addition of the pentafluorobromobenzene (98.8 g., 0.4 mole) dissolved in 200 ml. of tetrahydrofuran to magnesium turnings (9.7 g., 0.4 g. atom) in 400 ml. of tetrahydrofuran. The addition required 45 minutes during which the temperature rose to a maximum of 26° C. The dark brown mixture was stirred for an additional 60 minutes during which the temperature rose to a maximum of 28° C. Titration indicated a 97% yield of Grignard. The Grignard was cooled to 5° C. and stannic chloride (26.1 g., 0.1 mole) dissolved in 70 ml. of petroleum ether (B.P. 40–48° C.) was added dropwise to the Grignard during 15 minutes. After the mixture was stirred at room temperature for 3 days (Color Test I was negative) the Grignard was consumed. The precipitate was filtered, washed with hot dilute hydrochloric acid and then with water. The dried solid was recrystallized from benzene (or chloroform) to give 8.9 g. (15%) of tetraperfluorophenyltin, M.P. 222–223° C. The remainder of the material was intractable and appeared to be polymeric in nature.

Example V

Preparation of tetraperfluorophenyllead via perfluorophenylmagnesium bromide.—The general procedure as outlined in Example IV was followed except that lead dichloride was used in place of stannic chloride. The product tetraperfluorophenyllead, M.P. 206° C. was recrystallized from methanol. A yield of 3% of pure product was obtained.

By way of demonstrating the antioxidant properties and capabilities of the materials according to the present invention, the following tests were run in connection with the perfluoroaromatic derivatives of Example I.

A fluoroalkylcyanurate base fluid was blended with 0.5 weight percent of tetraperfluorophenyltin. The blended fluid was subjected to an oxidation test under the following test conditions: 20 liters of air per hour was blown through the blend for a period of 24 hours at 475° F. After the test period the blended fluid experienced only a 15.4% weight loss, no viscosity change, no acid number change and only a slight yellow discoloration.

The above evaluation test was repeated with another sample of fluoroalkylcyanurate except that no tetraperfluorophenyltin was added. The test procedure was identical. After the test period the fluid experienced a 72.9 weight loss, was extremely dark and had no flow properties.

While the foregoing invention has been described in considerable detail in connection with certain specific examples and preferred embodiments thereof, it is to be understood that the foregoing particularization has been for the purpose of illustration only and does not limit the invention as it is more precisely defined in the subjoined claims.

I claim:
1. Tetraperfluorophenyltin.
2. Tetraperfluorophenylgermanium.
3. Diphenyldiperfluorophenylgermanium.
4. Phenyltriperfluorophenylgermanium.
5. Triphenylperfluorophenylgermanium.

References Cited

UNITED STATES PATENTS

| | | | |
|---|---|---|---|
| 1,938,180 | 12/1933 | Groll | 260—11 |
| 3,010,979 | 11/1961 | Ramsden | 260—429.7 |
| 3,075,018 | 1/1963 | Pummer et al. | 260—606.5 |

OTHER REFERENCES

Holmes et al., Proc. Chem. Soc. (London) (1963), p. 108.

Bourn et al., Proc. Chem. Soc. (London) (1963), p. 200.

Chambers et al. Proc. Chem. Soc. (London) (1963), p. 208.

Coe et al., J. Chem. Soc. (London) 1962), pp. 3227–3229.

Chambers et al., J. Chem. Soc. (London) (1962), pp. 4367–4371.

Wall et al., J. Am. Chem. Soc. vol. 82, pp. 4846–4848.

TOBIAS E. LEVOW, *Primary Examiner.*

A. P. DEMERS, *Assistant Examiner.*